July 6, 1965 J. HAMPL 3,193,210
MOTION PICTURE CAMERA
Filed Sept. 14, 1962
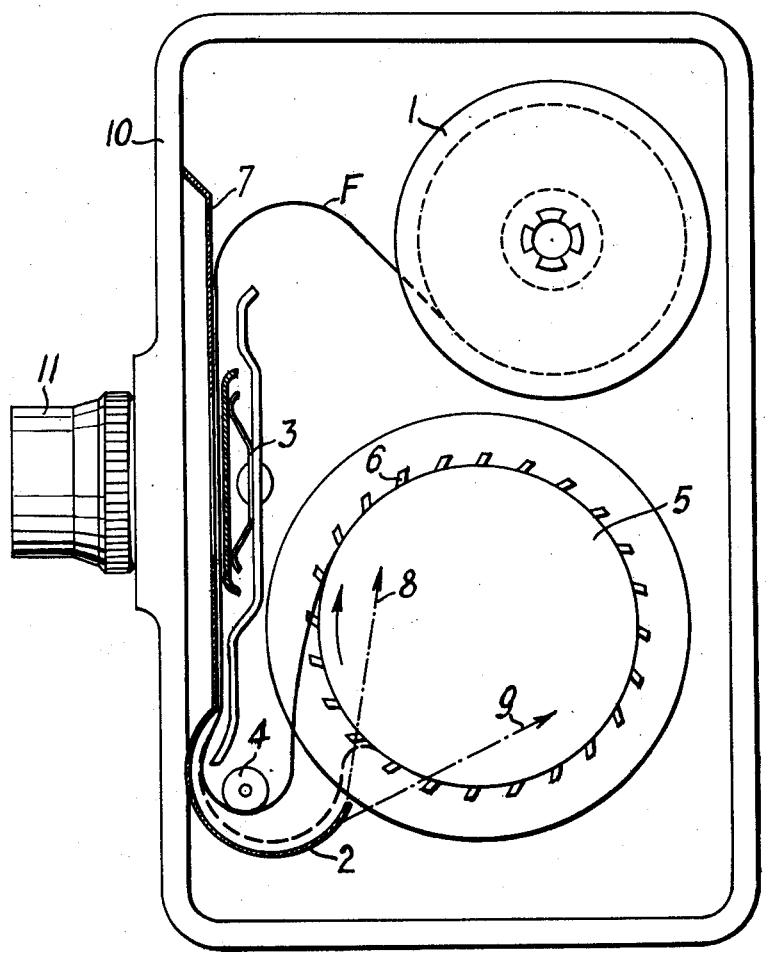
INVENTOR.
Jan Hampl
BY

United States Patent Office 3,193,210
Patented July 6, 1965

3,193,210
MOTION PICTURE CAMERA
Jan Hampl, Prerov, Czechoslovakia, assignor to Meopta, národní podnik, Prerov, Czechoslovakia
Filed Sept. 14, 1962, Ser. No. 223,637
7 Claims. (Cl. 242—71.2)

The present invention relates to a motion picture camera and is particularly concerned with a device for automatically threading a film from a supply spool to a take-up spool of the camera.

In known types of motion picture cameras, two principal methods of film loading have been used. In the most common method the film is manually threaded into a track, loosened to form two loops on either side of the film gate, and attached to the take-up spool. Said method is slow and requires the unwinding of a considerable length of film which is exposed to light and thereby damaged. This is especially disadvantageous with dual 8 mm. film whereon two rows of pictures are successively exposed.

In order to avoid said drawbacks, special film-holders have been designed which enclose the take-up and supply spools together with the film wound thereon. The film-holders are inserted in the camera as self-contained units whereby undesirable exposure of the film is avoided. The film-holders can only be used in a special camera. A supply of such film-holders is cumbersome and uncomfortable to carry especially when traveling.

It is an object of the present invention to provide a motion picture camera which comprises a device for automatically threading the film strip to the take-up spool of the camera from conventional standardized film spools without exposing a considerable length of film during loading.

The invention, in one of its aspects, provides guide means for automatically threading a film through the housing of a camera equipped with rotatable supply and take-up spools. In its more specific aspects, the invention provides guide means for guiding an end portion of a film wound on the supply spool in an elongated path from a film gate member toward the take-up spool in a direction having a major tangential component and another radially inward component with respect to a surface of the take-up spool which extends about the axis of rotation of the spool and carries a plurality of radially projecting teeth.

The guide means include a first guide member whose opposite end portions are near the film gate member and near the take-up spool respectively, and which has a guide surface that extends in a continuous concave arc from one to the other of the end portions. The guide surface on the end portion near the take-up spool extends in the afore-mentioned tangential and radially inward direction with respect to the spool surface. A second guide member has a convex guide face opposite the guide surface of the first guide member, and the path of the film extends between the concave guide surface and the convex guide face.

The invention will be now described, by way of example, with reference to the accompanying drawing which shows a motion picture camera provided with a device according to the present invention in side elevation and partly in section, the cover being removed from the camera housing.

The housing 10 of the illustrated camera carries a lens 11 and encloses an interchangeable daylight loading spool 1 and a take-up spool or core 5 having radially projecting teeth 6 mounted thereon. A film gate 7 is provided in the housing 10 in alignment with the lens 11. The gate is essentially a flat sheet member formed with an opening about the optical axis of the lens 11, and is integral with a fixed film guide 2 which, in the sectional view of the drawing, defines a continuous circular arc of more than 180° from an angular junction with the gate 7 toward the take-up spool 5. The gate 7 and guide 2 provide a continuous guiding surface for a film F. The portion of that surface provided by the guide 2 is cylindrical and concave.

In loading the camera, the free leading end of the film F is manually led in a loop from the daylight loading spool 1 to a portion of the film gate 7 within range of a conventional intermittent film feed mechanism represented in the drawing only by a pressure plate 3. The housing 10 may now be closed, and the film is fed further toward the fixed guide 2 by means of the feed mechanism. The free end of the film is aimed by the guide 2 towards the rotating teeth 6 of the take-up spool 5 which are obliquely forwardly inclined in the direction of take-up spool rotation.

The initial film path is indicated in the drawing by a broken line. When the first film perforation has been engaged by the nearest tooth 6, the film is drawn into the position represented in the drawing by a full line. A guide cylinder 4 arranged within the arc of the film guide 2 and having a convex guide face, maintains a film loop of appropriate size ahead of the rotating take-up spool 5. The spool 5 is coupled to the camera drive by a friction clutch as is conventional and not shown in the drawing. The film guide 2 may constitute a separate mechanical member or be an integral part of the camera housing 10 if so desired.

The automatic threading arrangement of the present invention may be used to particular advantage in motion picture cameras having special take-up spools of relatively great core diameter. The distance between the free end portion of the guide 2 and the take-up core 5 is small, so that the film F is reliably aligned with the teeth 6. The automatic treading arrangement of the invention is particularly useful in cameras in which two rows of frames are transversely juxtaposed on a film, and in which the two rows are sequentially exposed by reversing the direction of spool rotation after exposure of one row.

The free end portion of the guide 2 is shaped so as to aim the film toward the periphery of the take-up core 5 in a direction indicated in the drawing by a dot-and-dash arrow 8 and having a major component which is tangential to the core surface, and another component which is radially inward with respect to the spool 5. If the direction of rotation of the take-up core 5, when empty, is opposite to the direction indicated by a curved arrow, the inclination of the teeth 6 must be reversed, and the guide 2 must be modified in an obvious manner to discharge the film F in the direction of the arrow 9.

What I claim is:
1. In a motion picture camera, in combination:
    (a) a housing;
    (b) a supply spool and a take-up spool rotatably mounted in said housing;
    (c) a plurality of teeth radially projecting from a surface of said take-up spool extending about the axis of rotation thereof;
    (d) a film gate member mounted on said housing; and
    (e) guide means for guiding a leading free end portion of a film wound on said supply spool in an elongated path from said film gate member toward said take-up spool in a direction having a major tangential component and another radially inward component with respect to said surface of the take-up spool, said guide means including
        (1) a first guide member mounted in said housing in a fixed position and having one end portion near said film gate member and another end portion spacedly adjacent said take-up spool, and a guide surface extending in a continuous concave arc from said one end portion to said other end portion, the guide surface on said other end portion extending in said direction to direct the leading end portion of the film into engagement with said teeth on said spool surface, and (2) a second guide member having a convex guide face opposite the guide surface of said first guide member, said path extending between said guide surface and said guide face.

2. In a camera as set forth in claim 1, said second guide member being arranged within the arc defined by said guide surface.

3. In a camera as set forth in claim 1, said arc being substantially circular and having a length of not substantially less than 180°.

4. In a camera as set forth in claim 1, said film gate member defining a guiding surface contiguous with said guide surface.

5. In a camera as set forth in claim 1, said film gate member defining a guiding surface angularly offset from the guide surface on said one end portion of said first guide member.

6. In a camera as set forth in claim 1, said teeth being obliquely forwardly inclined in the direction of rotation of said take-up spool.

7. In a motion picture camera, in combination:
(a) a housing;
(b) a supply spool and a take-up spool rotatably mounted in said housing;
(c) a plurality of teeth radially projecting from a surface of said take-up spool extending about the axis of rotation thereof;
(d) a film gate member mounted on said housing; and
(e) guide means for guiding a leading free end portion of a film wound on said supply spool from said film gate member toward said take-up spool in a direction having a major tangential component and another radially inward component with respect to said surface of the take-up spool,
(1) said guide means including a guide member mounted in said housing in a fixed position and having one end portion near said film gate member and another end portion spacedly adjacent said take-up spool, and a guide surface extending in a continuous concave arc from said one end portion to said other end portion, the guide surface on said other end portion extending in said direction to direct the leading end portion of the film into engagement with said teeth on said spool surface.

References Cited by the Examiner

UNITED STATES PATENTS

| | | | |
|---|---|---|---|
| 2,054,586 | 9/36 | Mayer | 242—76 |
| 2,231,665 | 2/41 | Fairbanks | 352—78 |
| 2,703,034 | 3/55 | Thomas | 352—158 |
| 3,002,424 | 10/61 | Miller | 352—84 |
| 3,049,981 | 8/62 | Elliott et al. | 352—158 X |
| 3,081,925 | 3/63 | Hanken | 226—91 |

FOREIGN PATENTS 944,070   10/48   France.

MERVIN STEIN, *Primary Examiner.*

WILLIAM MISIEK, *Examiner.*